US010650222B2

(12) United States Patent
Olsen et al.

(10) Patent No.: US 10,650,222 B2
(45) Date of Patent: May 12, 2020

(54) SYSTEM AND METHOD FOR TOY RECOGNITION

(71) Applicant: LEGO A/S, Billund (DK)

(72) Inventors: Tim Gorm Kaas-Rasmussen Olsen, Vejle (DK); Tue Jakobsen, Vandel (DK); Jesper Søderberg, Galten (DK); Fraser Lovatt, Kolding (DK)

(73) Assignee: LEGO A/S (DK)

(*) Notice: Subject to any disclaimer, the term of this patent is extended or adjusted under 35 U.S.C. 154(b) by 0 days.

(21) Appl. No.: 16/091,949

(22) PCT Filed: May 8, 2017

(86) PCT No.: PCT/EP2017/060865
§ 371 (c)(1),
(2) Date: Oct. 5, 2018

(87) PCT Pub. No.: WO2017/194439
PCT Pub. Date: Nov. 16, 2017

(65) Prior Publication Data
US 2019/0138785 A1    May 9, 2019

(30) Foreign Application Priority Data

May 9, 2016 (DK) .................................. 2016 70304

(51) Int. Cl.
A63F 13/42 (2014.01)
A63F 13/98 (2014.01)
(Continued)

(52) U.S. Cl.
CPC ........ G06K 9/00201 (2013.01); A63F 13/213 (2014.09); A63F 13/42 (2014.09);
(Continued)

(58) Field of Classification Search
CPC ............................ G06K 9/00201; A63F 13/42
See application file for complete search history.

(56) References Cited

U.S. PATENT DOCUMENTS 3,005,282 A    10/1961  Christiansen
D253,711 S    12/1979  Christiansen
(Continued)

FOREIGN PATENT DOCUMENTS

EP        2 749 327 A1      7/2014
WO    2004/034333 A1      4/2004
(Continued)

OTHER PUBLICATIONS

DPTO's Search Report and Search Opinion issued in Danish priority patent application No. PA 2016 70304, dated Nov. 29, 2016.
(Continued)

Primary Examiner — Jitesh Patel
(74) Attorney, Agent, or Firm — Day Pitney LLP

(57) ABSTRACT

A computer-implemented method for recognizing a plurality of real-world toy construction elements of a toy construction system assembled to form a real-world toy construction model, each real-world toy construction element comprising coupling members for detachably connecting the real-world toy construction element with one or more other real-world toy construction elements of the toy construction system so as to form the real-world toy construction model; wherein the method comprises: receiving at least one captured image of the real world toy construction model; processing the at least one captured image so as to at least preliminarily recognise at least a first real-world toy construction element in the at least one captured image as a first known real-world toy construction element from stored digital representations of a plurality of known real-world toy construction elements of the toy construction system, each digital representation comprising connectivity information indicative of how the (Continued)

corresponding real-world toy construction element can be detachably connected to other real-world toy construction elements of the toy construction system; detecting image data of at least a second real-world toy construction element in the image within a proximity of the recognised first real-world toy construction element; recognising the second real-world toy construction element as a second known real-world toy construction element from said stored digital representations of said plurality of known real-world toy construction elements of the toy construction system; wherein recognising the second real-world toy construction element is based at least in part on the connectivity information associated with the first and second known toy construction elements.

22 Claims, 7 Drawing Sheets

(51) Int. Cl.
A63F 13/65 (2014.01)
A63F 13/213 (2014.01)
A63F 13/655 (2014.01)
G06T 7/50 (2017.01)
G06T 7/90 (2017.01)
G06T 7/70 (2017.01)
G06T 17/00 (2006.01)
A63H 33/04 (2006.01)
G06K 9/00 (2006.01)
G06K 9/62 (2006.01)

(52) U.S. Cl.
CPC .......... A63F 13/65 (2014.09); A63F 13/655 (2014.09); A63F 13/98 (2014.09); G06K 9/00624 (2013.01); G06T 7/50 (2017.01); G06T 7/70 (2017.01); G06T 7/90 (2017.01); G06T 17/00 (2013.01); A63F 2300/1087 (2013.01); A63F 2300/6045 (2013.01); A63F 2300/695 (2013.01); A63H 33/04 (2013.01); G06K 9/6277 (2013.01); G06T 2207/10016 (2013.01); G06T 2207/10024 (2013.01); G06T 2207/10028 (2013.01); G06T 2207/20076 (2013.01); G06T 2207/30244 (2013.01)

(56) References Cited

U.S. PATENT DOCUMENTS

| | | | |
|---|---|---|---|
| 2002/0196250 A1* | 12/2002 | Anderson | G06T 19/00 345/420 |
| 2003/0132966 A1* | 7/2003 | Simas | G06F 17/5004 715/764 |
| 2006/0106815 A1 | 5/2006 | Timcenko | |
| 2007/0262984 A1* | 11/2007 | Pruss | G06T 19/20 345/420 |
| 2008/0228450 A1* | 9/2008 | Jakobsen | G06T 17/10 703/2 |
| 2012/0280993 A1* | 11/2012 | Jakobsen | G06T 15/40 345/420 |
| 2012/0295703 A1 | 11/2012 | Reiche et al. | |
| 2013/0016097 A1* | 1/2013 | Coene | G06T 15/205 345/419 |
| 2013/0135081 A1 | 5/2013 | McCloskey et al. | |
| 2014/0256430 A1 | 9/2014 | Matsumura | |
| 2014/0302740 A1* | 10/2014 | Nag | A63H 33/042 446/91 |
| 2014/0378022 A1* | 12/2014 | Muthyala | A63H 33/06 446/91 |
| 2015/0023602 A1 | 1/2015 | Wnuk et al. | |
| 2015/0063712 A1* | 3/2015 | Boncyk | G06K 9/228 382/224 |
| 2015/0125835 A1 | 5/2015 | Wittich et al. | |
| 2016/0085518 A1* | 3/2016 | I | G06K 9/00201 717/105 |

FOREIGN PATENT DOCUMENTS

| | | |
|---|---|---|
| WO | 2011/017393 A1 | 2/2011 |
| WO | 2013/110780 A1 | 8/2013 |
| WO | 2015/185629 A2 | 12/2015 |

OTHER PUBLICATIONS

International Search Report issued in corresponding international application No. PCT/EP2017/060865, dated Aug. 31, 2017.
Written Opinion of the International Searching Authority issued in corresponding international application No. PCT/EP2017/060865, dated Aug. 31, 2017.
Miller et al., Interactive 3D Model Acquisition and Tracking of Building Block Structures, IEEE Transactions on Visualization and Computer Graphics, 18:4, pp. 651-659, Apr. 2012.

* cited by examiner

SYSTEM AND METHOD FOR TOY RECOGNITION

CROSS-REFERENCE TO RELATED APPLICATIONS

This application is a U.S. National Stage of International Application No. PCT/EP2017/060865, filed on 8 May 2017 and published on 16 Nov. 2017, as WO 2017/194439, which claims the benefit of priority to Danish Patent Application No. DK PA201670304, filed on 9 May 2016. The content of each of the above referenced patent applications is incorporated herein by reference in its entirety for any purpose whatsoever.

The present invention relates to the application of computer vision technology for toys-to-life applications and, more particularly, to a system and a method for recognition of toy construction models that use modular, mutually interconnectable toy construction elements.

BACKGROUND OF THE INVENTION

Different attempts of integrating virtual representations of physical objects into a virtual game play have been made. However, a close link between the physical world and a virtual game play stimulating the interactive involvement of the user and, in particular, stimulating the development of different skills by children's game playing is still missing. Therefore there is a need for a new approach to interactive game play.

Most toy-enhanced computer games or so-called toys-to-life systems currently involve systems wherein toys must have a physical component configured to communicate with a special reader via some form of wireless communication like RFID, NFC etc. Examples of such systems are disclosed in e.g. US 2012/0295703, EP 2749327 and US 2014/256430. It is generally desirable to provide game systems that do not require the toy to comprise elements that are capable of communicating with a reader device so as to be able to identify a toy element, and to create its virtual digital representation and associate it with additional digital data.

WO 2011/017393 describes a system that uses computer vision to detect a toy construction model on a special background. To this end, an assembled model is on a special background plate with a specific pattern printed on it. In some systems the image-acquiring device may even need to be aligned to a specific angle relative to the toy element assembly for the recognition to take place. Moreover, this prior art method is limited to the construction of models that are planar, parallel to the plane of the background. It would thus generally be desirable to increase the robustness of such methods and, in particular to increase the recognition performance recognising the individual toy construction elements from which the toy construction model is constructed, even for arbitrary 3D models. For example, a sufficiently accurate recognition of the individual elements is desirable for applications where a virtual toy construction model is to be created that as closely as possible corresponds to a real-world 3D toy construction model.

One particular difficulty when detecting individual toy construction elements in a 3D toy construction model is related to the fact that the individual elements may not always be completely visible, or not visible from all sides, as they are connected to other elements of the model that may at least partially conceal the toy construction element.

SUMMARY

In accordance with one aspect disclosed herein, a computer-implemented method for recognizing a plurality of real-world construction elements of a construction system assembled to form a real-world construction model, in particular real-world toy construction elements of a toy construction system assembled to form a real-world toy construction model, each real-world construction element comprising coupling members for detachably connecting the real-world construction element with one or more other real-world construction elements of the construction system so as to form the real-world construction model; wherein the method comprises:

receiving at least one captured image of the real world construction model;

processing the at least one captured image so as to recognise at least a first real-world construction element in the at least one captured image as a first known real-world construction element from stored digital representations of a plurality of known real-world construction elements of the construction system, each digital representation comprising connectivity information indicative of how the corresponding real-world construction element can be detachably connected to other real-world construction elements of the construction system;

detecting image data of at least a second real-world construction element in the image within a proximity of the recognised first real-world construction element;

recognising the second real-world construction element as a second known real-world construction element from said stored digital representations of said plurality of known real-world construction elements of the construction system; wherein recognising the second real-world construction element is based at least in part on the connectivity information associated with the first and second known construction elements.

The real-world construction model is an assembly of detachably interconnected real-world construction elements, e.g. a figurine constructed from multiple parts, such as a torso part, leg parts, accessory parts, and/or the like. Such modular construction systems allow construction of a vast variety of assembled construction models. An assembled construction model may include few or many individual construction elements that may be identical or different from each other. For example, toy construction models involving toy construction elements have so far proven difficult to be detected in an efficient yet reliable and robust manner. In particular, the construction model may comprise one or more real-world construction elements that are partly or even completely concealed by other construction elements of the model when viewed from one viewpoint, from more than one viewpoint or even from all viewpoints. Use of the connectivity information allows the process to identify such construction elements even if they are partly or even completely concealed. Even when only a view visible features of the construction element can be discerned from the image, e.g. the element's color and a partial side view of the element from one direction, this information may be sufficient when the process can also determine which neighbouring construction elements the partly concealed construction element is connected with.

By using connectivity information associated with a construction element to be recognised and corresponding connectivity information associated with one or more other construction elements of the construction model, the recognition performance may thus be significantly increased. The connectivity information may be stored as part of or otherwise associated with the stored digital representations of the plurality of known real-world construction elements of the construction system. For the purpose of the present disclosure, the stored digital representations of the plurality of known real-world construction elements of the construction system will also be referred to as a library of known real-world construction elements of the construction system (or briefly as the library).

In some embodiments, the method comprises processing the captured image so as to produce one or more processed versions of the captured image, and basing the recognition on at least the one or more processed versions of the captured image. The processing step may comprise any suitable image processing mechanism, e.g. for changing the image contrast, changing a color distribution, cropping, blurring, eroding, dilating, adding randomness masks or creating different image subcrops, etc. or combinations thereof. In some embodiments, processing the at least one captured image comprises identifying an object portion and a background portion of the at least one captured image, the object portion representing the construction model.

In some embodiments, the method comprises determining a first likelihood score indicative of a likelihood that said recognised first real-world construction element is the first known real-world construction element. In particular, in some embodiments, the method comprises:
    creating a first set of candidate construction elements, each candidate construction element of the set being selected from the plurality of known real-world construction elements; and
    for each candidate construction element, determining an associated first likelihood score indicative of a likelihood that the recognised first real-world construction element is said candidate construction element.

Hence, the recognised first construction element does not need to be recognised with absolute certainty but may merely be recognised with a certain probability and there may be a set of recognition alternatives, i.e. a set of candidate construction elements, each of which having a respective possibility of being the recognised first construction element. It will further be appreciated, that the same holds for the recognition of the second construction element, i.e. the second construction element may also be recognised with an associated second likelihood score, and there may be a second set of candidate construction elements, each having an associated second likelihood score indicative of a likelihood that the recognised second construction element is indeed the associated candidate construction element.

In particular, in some embodiments, recognising a real-world construction element, e.g. the first or second real-world construction element, comprises:
    determining one or more candidate construction elements from said stored digital representations of said plurality of known real-world construction elements of the construction system, each candidate construction element having an associated likelihood score indicative of a likelihood of the respective candidate construction element to be the detected real-world construction element depicted in the at least one captured image.

The recognised first real-world construction element may thus be one of a first set of candidate world construction elements, e.g. a candidate construction element having a highest first likelihood score of the candidate construction elements of said first set. In some embodiments the recognition process may be an iterative process comprising multiple iterations where each iteration may utilise results of one or more previous iterations. The recognition of the first real-world construction system may be final, i.e. it may maintain unchanged during the remainder of the recognition process. Alternatively, the first real-world construction element may be a preliminarily recognised first real-world construction element where the recognition decision may still be subject to change in a subsequent iteration, e.g. because the associated likelihood score may be recomputed in a subsequent iteration. In particular, in some embodiments, the method further comprises updating the first likelihood score based on the recognition of the second real-world construction element. For example, recognizing the second real-world construction elements with a high second likelihood score may cause the process to increase the first likelihood scores of candidates from the first set of candidate construction elements that have coupling members compatible with the coupling members of the second real-world construction element. Similarly, recognizing the second real-world construction elements with a high second likelihood score may cause the process to decrease the first likelihood scores of candidates from the first set that have coupling members incompatible with the coupling members of the second real-world construction element. In particular, in some embodiments, the process may create respective first and second candidate sets of candidate real-world construction elements each candidate set being associated with a respective first and second detected construction element in a proximity with each other. For each candidate of the second candidate set, the process may thus compute a likelihood set of likelihood scores where each likelihood score of the likelihood set may be computed under the assumption that the first construction element is a respective one of the candidates of the first candidate set. Similarly, for each candidate of the first candidate set, the process may compute a likelihood set of likelihood scores where each likelihood score of said likelihood set may be computed under the assumption that the second construction element is a respective one of the candidates of the second candidate set. The process may thus recognise the first and second construction elements as the pair of candidates from the first and second candidate sets that have a highest combined likelihood score.

In some embodiments, the process may involve an optimisation process, e.g. using linear programming techniques or other suitable optimisation techniques, to recognise two or more construction elements that have been detected within a proximity of each other. Generally a proximity between construction elements may e.g. include construction elements that are detected as being adjacent to each other, e.g. as having adjacent bounding volumes, that or abutting each other, that are connected to each other or whose respective positions make an interconnection between the detected construction elements otherwise likely. The optimisation process may be configured to maximise a combined likelihood score for said two or more construction elements.

Computing the likelihood scores of respective candidate construction elements may be based on how well a candidate construction element can be positioned relative to a construction model so as to be consistent with the captured image. In particular, in some embodiments, recognising the second real-world construction element comprises:
    for each of the candidate construction elements and based on the at least one captured image, estimating a placement of a corresponding virtual construction element in a virtual construction model corresponding to the real-world construction model;

computing a respective correspondence score for each candidate construction element based on a correlation of the estimated placement with at least the captured image;

selecting a candidate construction element and a corresponding placement based on at least the computed correspondence scores.

To this end, the digital representations of each known real-world construction elements of the library may comprise a digital 3D representation of a virtual version of said construction element, e.g. a mesh model, a voxel model or another suitable digital representation. The representation may further include visible attributes of the construction element, such as color(s), surface texture(s) and/or the like. Based on the digital representation, the process may compute a correspondence score indicative of how well a candidate placement (position and orientation) of the construction element corresponds with the captured image data. Optionally this computation may at least in part be based on captured 3D data. The correspondence score may be indicative of whether capturing an image of the real world construction element positioned at a candidate placement relative to a camera position would result in image (and, optionally, depth) data consistent with the actual captured one or more images. Estimating the placement in a virtual construction model may thus be based at least on received depth information and/or on received colour information.

According to some embodiments, recognising the second real-world construction element comprises determining a first connectivity likelihood that a coupling member of the recognized first real-world construction element is connected to another real-world construction element of the real-world construction model. To this end, the digital representations of each known real-world construction element of the library may comprise connectivity information, e.g. including positions and types of coupling members of the known real-world construction elements. The positions of the coupling members may be specified relative to the geometry of the known construction element. Based on the captured image data, and for a recognized construction element, the process may e.g. determine which coupling members of the construction element are visible and which are concealed by a neighbouring construction element. Hence, the process may compute, for each coupling member of the construction element, a connectivity likelihood that said coupling member actually engages another coupling member of a neighbouring construction element. For example, visible coupling members may be assigned a low likelihood while coupling members that are concealed by a neigbouring construction element has a higher probability. In embodiments, where the process also receives depth information and/or images from different viewpoints, this determination may be performed more accurately. It will be appreciated that, for the purpose of this determination, the neighboring construction elements do not necessarily have to be recognized already. A neighbouring construction element of a given construction element may be a construction element in a predetermined proximity of the given construction element.

Moreover, for an estimated placement of a candidate virtual construction element—the virtual construction element corresponding to a known candidate construction element—in a virtual construction model, the process may determine whether this placement is consistent with the placements of other virtual construction elements within the construction model—in particular with other virtual construction elements that correspond to respective other already recognised or candidate real-world construction elements. Accordingly, the process may determine whether the positions and types of the other virtual construction elements in the virtual construction model would actually allow for a placement of the candidate virtual construction element and for the connection of the candidate virtual construction element with one or more other virtual construction elements of the virtual construction model. The process may thus compute a connectivity likelihood score for the candidate virtual construction element where the connectivity likelihood score is indicative of a degree of conformity of the coupling members (i.e. of their positions and types) with the corresponding coupling members of the other (and in particular neighbouring) virtual construction elements in the model. The connectivity likelihood computed for a virtual version of the construction model and virtual versions the known construction elements (i.e. from their digital representations stored in the library of known construction elements) may thus be assigned to a candidate construction element and used for computing the likelihood that a detected construction element is indeed said candidate construction element from the library of known elements.

Hence, in some embodiments, recognising the second real-world construction element comprises:

for each candidate construction element, determining a second connectivity likelihood that a coupling member of the candidate construction element, when positioned at a position of the detected second real-world construction element within the real-world construction model is connectable with a coupling member of the recognized first real-world construction element;

determining the second likelihood score based on at least the determined second connectivity likelihood.

The second likelihood score may be determined based on at least the determined first connectivity likelihood and/or the second connectivity likelihood.

The digital representations of the known real-world construction elements may comprise a plurality of data records, each representing a known construction element. The data records may be stored in a database or other suitable data structure. Each data record may include an identifier of the known real-world construction element and a number of attributes of the known real-world construction element such as one or more of the following: a colour, a size, a shape, connectivity information, etc. The connectivity information is indicative of how a real-world construction element may be connected to other real-world construction elements. In particular, a construction element may be connected in a limited number of spatial configurations, i.e. in a limited number of positions and/or orientations relative to the other one or more construction elements. Moreover, the real-world construction elements may comprise coupling members that are compatible with corresponding mating coupling members of other real-world construction elements of the system. For example, connectivity information may be stored and used to determine physical constraints for the placement of real-world construction elements relative to other real-world construction elements, e.g. as disclosed in WO 04/034333.

In some embodiment, the digital representation of each known real-world construction element is indicative of a number of grids relative to the corresponding known real-world construction element, each grid having a number of grid points; and each of the coupling members of the known real-world construction element is associated with one of the grid points and has a corresponding connection type.

Generally, the recognition of real-world construction elements may be based on data driven methods such as neural networks or other object recognition technologies known as such in the art of computer vision.

In some embodiments, the method outputs identifiers of the individual recognized real-world construction elements and position coordinates, e.g. indicative of a position and orientation of the recognised construction element, e.g. relative to a global coordinate system or relative to a coordinate system associated with the construction model.

Once the real-world construction elements of the real-world construction model have been recognised, this information may be used in a variety of ways. For example, the method may comprise matching one or more of the recognised real-world construction elements and/or the construction model with additional information which may be stored in the library of known construction elements or in another suitable data storage. Such additional information may e.g. include information about attributes of a corresponding construction model or of its constituents, e.g. behaviour information indicative of how a virtual construction model or individual virtual construction elements can move or otherwise behave in a virtual world, and/or the like. In some embodiments, a virtual toy construction model corresponding to a recognised real-world toy construction model may be inserted into a virtual world, as a virtual object or character in a game play.

In some embodiments, the construction system may comprise a hierarchy of construction elements comprising different classes of elements, e.g. primary elements, such as figurines, minifigures, or the like and secondary elements that may be associated, e.g. connected, to the primary elements. Examples of such secondary elements may include accessories to a figurine or minifigure such as weapons, cloth items, tools, etc. Hence, based on the recognition of the individual elements, a composite recognition may be performed, e.g. identifying a primary element supplemented with one or more secondary elements, e.g. a knight carrying a sword and a shield. In a computer game or other virtual environment, a recognised construction model may be represented as a virtual assembly of virtual construction elements. The virtual construction elements may correspond to the recognised real-world construction elements in that they are direct representations of the real-world construction elements having the same shape, proportions and properties. The real-world construction elements may be defined by a predetermined length unit (1 L.U.) in the physical space, wherein linear dimensions of the real-world construction elements in a Cartesian coordinate system in x-, y-, and z-directions of the physical space are expressed as integer multiples of the predetermined length unit in the physical space (n L.U.'s). Accordingly, the virtual construction elements may be defined by a corresponding predetermined length unit, wherein linear dimensions of the virtual construction elements in a Cartesian coordinate system in x-, y-, and z-directions of the virtual space are expressed as integer multiples of the corresponding predetermined length unit in the virtual space. The predetermined unit length in the physical space and the corresponding predetermined unit length in the virtual space may be the same.

Many types of game play can be enhanced by recognising physical toy construction models, including, but not limited to, nurture-games, battle type games (player vs. player), racing games, and role playing action/resource games, virtual construction games, massive multiplayer online games, strategy games, augmented reality games, games on mobile devices, etc.

Some embodiments of the method may further include controlling interaction of the virtual construction model with other virtual objects, automatically or responsive to user inputs, where one or more aspects or results of the interaction are at least in part controlled by virtual attributes of the recognized construction elements. For example, the interaction may involve a user-controlled manipulation of the virtual construction model including e.g. the adding, removal or repositioning of individual virtual construction elements. Furthermore, in some embodiments, capabilities or other attributes of the virtual construction model may at least in part be determined by features of the recognized construction model and/or it's the construction elements from which it is constructed.

In some embodiments, the method may further include controlling one or more functions of the recognised real-world construction model. In particular, the method may comprise communicating one or more control signals to a controller which controller is configured to control a controllable function of the real-world construction model. The controller may be included in the real-world construction model, e.g. in one of the real-world construction elements, or it may be a separate controller. The control signal may be generated or selected responsive to the recognised construction element and, in particular created or selected so as to match the recognised real-world construction model. For example, the construction system may include one or more output construction elements that are configured to perform a controllable function, e.g. a motor or other device for effectuating a motion, a light source, etc. Additionally or alternatively, the construction system may include input construction elements that include an input device or a sensor, e.g. a button, a light sensor, a tilt sensor, etc. The toy construction system may further comprise an interface circuit configured to communicate with a processing device so as to communicate input/sensor signals or data from the input construction elements to the processing device and/or to communicate control signals or data from the data processing system to the output construction elements. The interface circuit may be configured to communicate with the processing device in a wired or wireless manner. The interface circuit may be implemented as a separate interface construction element that can be connected to one or more output and/or input construction elements in a wireless or wired fashion. The interface circuit may also be integrated into one, some or even all the input and/or output construction elements. For example all input and/or output construction elements may include a Bluetooth circuit or other wireless communications circuit. Hence, the processing device may be configured to detect which input and/or output construction elements are present in a construction model and control and/or program the construction model accordingly. Also, the processing device may include logic that transforms general commands (e.g. move forward) into specific commands adapted to a specific, recognised toy construction model (e.g. a control of individual ones of a set of motors).

In some embodiments, the method comprises detecting real-world construction elements that have been added to the real-world construction model, e.g. by detecting changes in a real-world construction model based on a sequence of captured images. The method may comprise may utilise information about which real-world construction elements are already present in a real-world construction model—e.g.

from previous iterations of a recognition process as described herein—the method may utilise the known physical constraints to facilitate the recognition of the newly added real-world construction element. In particular, in some embodiments, the method may provide a list of candidate real-world construction elements, each having a likelihood of being the newly added toy object. The process may then determine whether placement of a candidate real-world construction element at the detected position within the scene (and, in particular, with a previously recognised first construction element of the model) is compatible with the constraints imposed by the construction system. The process may thus determine a most likely one of the candidate real-world construction elements.

In some embodiments, the method may receive a color image, e.g. from a digital camera, and, optionally, additional depth information which may then be used by the recognition process. For example, embodiments of the method may utilise the depth information for detecting 3D positions of real-world construction elements to be recognised. Alternatively or additionally, embodiments of the method may use the depth information for determining whether a candidate construction element can be positioned at a detected 3D position and/or orientation in accordance with the physical constraints imposed by the construction system. The depth information may be provided in a number of forms, e.g. based on a 3D depth map, a map of local surface properties, such as surface curvatures, and/or the like.

The present disclosure relates to different aspects including the method described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a computer program encoded on a computer readable medium, such as a disk drive, memory device or other data storage device. The computer program includes an executable computer program code configured to instruct a data processing system to perform steps of embodiments of the method described herein.

According to a further aspect, disclosed herein are embodiments of a recognition system comprising a data processing system that is configured to perform the steps of an embodiment of the method disclosed herein. For example, the data processing system may be so configured by having stored thereon a computer program as disclosed herein. Examples of a data processing system include a suitably programmed general purpose computer, such as a stationary computer or a portable processing device, e.g. a tablet computer, a laptop computer, a smartphone or other mobile device. It will be appreciated that the data processing system may be implemented as a client-server or a similar distributed system, where the image capture and other user interaction is performed by a client device, while the image processing and/or recognition tasks and/or other computational tasks may be performed by a remote host system in communication with the client device.

In some embodiments, the data processing system may include an image capturing device, e.g. as an integral camera or similar image capturing device of a portable data processing device. In some embodiments, the recognition system may comprise an image capturing device that is separate from the data processing system, e.g. an image capturing device that is connectable for data or signal communication to a computer, portable data processing device or other data processing device.

The image capturing device may include a camera. In some embodiments, the camera is a digital camera such as a conventional digital camera. In some embodiments, the image capturing device comprises a 3D capturing device such as a 3D sensitive camera, e.g. a depth sensitive camera combining high resolution image information with depth information. An example of a depth-sensitive camera is the Intel® RealSense™ 3D camera, such as the model F200 available in a developer kit from Intel Corporation. In some embodiments the image capturing device may be comprised in an image acquisition station which may comprise the image capturing device, e.g. one or more digital cameras, and an object support for receiving a real-world construction model whose image is to be captured. The image acquisition station may further comprise one or more mechanisms for changing the viewpoint of the camera relative to the object support. For example, the camera may be movably mounted or the object support may be movably mounted, e.g. rotatably mounted and/or movable such that a distance between the camera and the object support and/or a relative orientation between them may be varied. The image acquisition station may further comprise one or more light sources and, optionally, an illumination controller adapted to change the illumination of the physical toy object, e.g. the intensity and/or color distribution of the illuminating light and/or the direction from which the toy object is illuminated.

During the recognition process, a construction model may be targeted with the image capturing device. In some embodiments, the image capturing device communicates with a display showing a scene as seen by the image capturing device so as to facilitate targeting the desired real-world construction model whose image is to be captured. The image capturing device and/or the display further communicate with a processor and data storage of the recognition system. Preferably, the image capturing device, the processor and/or the display are integrated in a single portable device, such as a tablet computer, a portable computer, a smartphone or the like. Alternatively, according to some embodiments, an image capturing device or a portable device with an image capturing device may communicate with a computer, e.g. by wireless communication with a computing device comprising a processor, data storage and a display. In some embodiments, the image capturing device may be stationary relative to the construction model while, in other embodiments, the image capturing device and/or the construction model is moved around so as to capture a series of images of the construction model from different viewpoints. In some embodiments, the process comprises capturing a series of images of the construction model, from the same or from different viewpoints, and to detect changes in the construction model over time, e.g. due to a user adding construction elements to the construction model, removing construction elements from the construction model or repositioning construction elements relative to the construction model. The series of images may be in the form of images captured at discrete times, a video stream or the like.

Some embodiments of a recognition system may comprise a detection module and a recognition module. The detection module may be configured to perform image detection of a captured image so as to detect one or more construction elements in the captured digital image. The detection module may output an indication of one or more regions of interest within the captured image, e.g. region of interest including a potentially recognizable construction elements. The recognition module may thus receive the one or more part-images or region(s) of interest from the detection module. The recognition module may be configured to recognize the detected one or more construction elements. It will be appreciated that the detection and recognition modules may be integrated into a single module or provided as separate modules. In some embodiments, the detection and recognition sub-processes may be performed iteratively. For example, the detection module may output one or more candidate regions or part-images which are then fed into the recognition module. The recognition module may then perform a classification for each of the candidate regions or part-images; based on the output of the classification model, one or more of the candidate regions/part-images may then be discarded, e.g. based on a likelihood score output by the classification model, or based on an evaluation whether the predicted construction element(s) is/are consistent with prior knowledge about the construction model, e.g. knowledge about other construction elements in the construction model and about physical constraints of the placement and/or interconnection of construction elements relative to each other as described herein.

According to a further aspect, disclosed herein are embodiments of a construction system including a plurality of real-world construction elements, an image capturing device and a processor programmed to perform the steps of the method described herein. For example, the system may comprise a data processing system comprising the processor, e.g. a suitably programmed central processing unit.

According to a further aspect, disclosed herein are embodiments of an interactive game system including an image capturing device, a display adapted to show at least image data captured by the image capturing device and a processor programmed to directly or indirectly interact with the image capturing device or act on the image data received directly or indirectly from the image capturing device and to perform processing steps of the above-mentioned method. The interactive game system may further be adapted to create a virtual three-dimensional representation of one or more of the recognised construction elements and/or the construction model.

Additional features and advantages will be made apparent from the following detailed description of embodiments that proceeds with reference to the accompanying drawings.

Embodiments of the method and system disclosed herein may be used in connection with a variety of construction toys that use toy construction elements having coupling members that may utilise various assembly systems like magnets, studs, notches, sleeves, with or without interlocking connection, frictional connection etc. Examples of these systems include but are not limited to the toy constructions system available under the tradename LEGO. For example, U.S. Pat. No. 3,005,282 and USD253711S disclose one such interlocking toy construction system and toy figures, respectively. Accordingly, in various embodiments of the invention, toy construction elements may be interlocking toy construction elements such as bricks, parts, accessories, mini-figures, weapons, animals, plants or other pieces that can be physically attached to each other so as to form a toy assembly. The coupling members may comprise mating studs and cavities, ball joints, connections between axels and holes, etc.

BRIEF DESCRIPTION OF THE DRAWINGS

Preferred embodiments of the invention will be described in more detail in connection with the appended drawings, which show in FIG. 1 schematically illustrates an embodiment of a recognition system that uses an embodiment of the recognition processes described herein.

DETAILED DESCRIPTION

Figure 1:
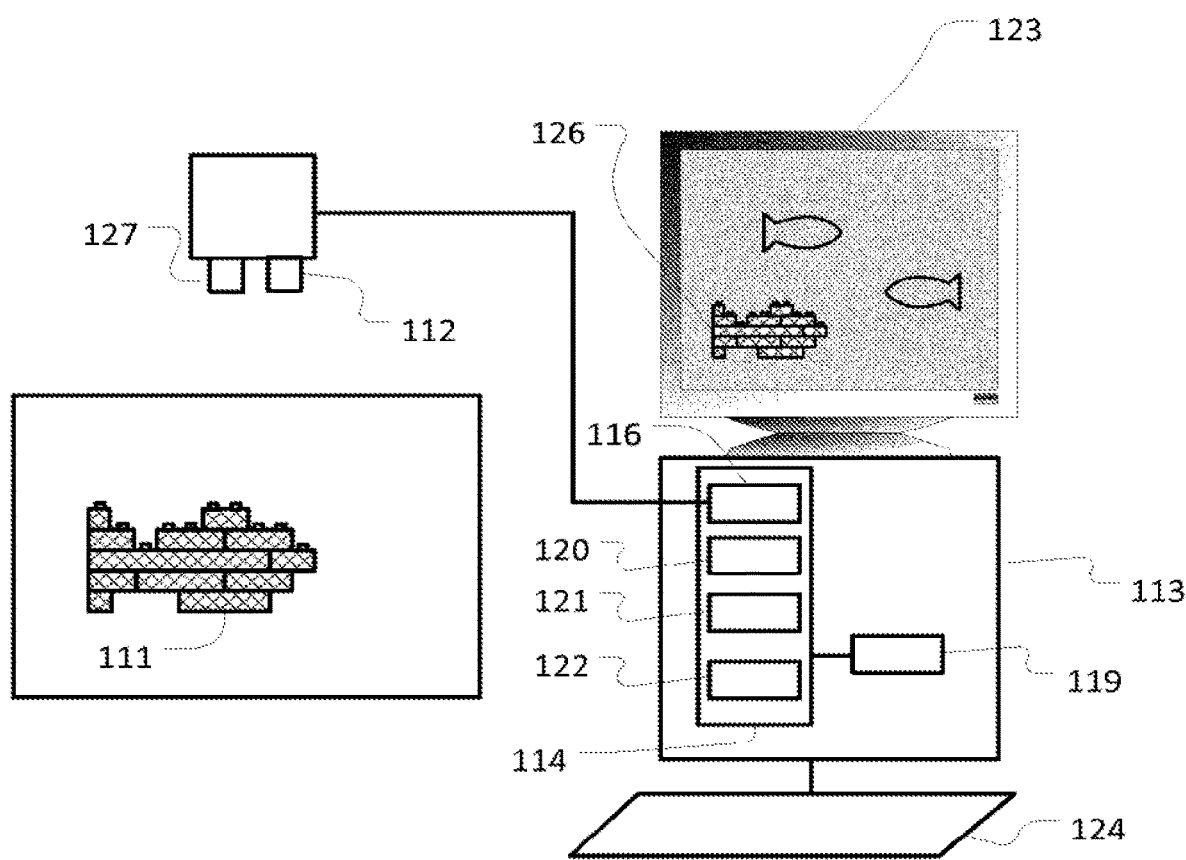

FIG. 1 schematically illustrates an embodiment of a recognition system that uses an embodiment of the recognition processes described herein as a part of a game system.

In particular, the game system provides a real-world building experience with real-world toy construction elements and brings that experience into the digital world. The game system automatically generates digital representations of toy construction elements as they are used by the user in a physical building process to create a real-world toy construction assembly or model, and the system accurately creates in real time a digital version of the resulting assembly that is being built. The digital representation of the assembled toy construction model may have specific behaviours in the digital environment based on the real-world toy construction elements that have been used in the real-world construction process. Seamless integration of physical and digital game experiences is achieved as described in the following. It will be appreciated, however, that embodiments of the recognition system and method described herein may also be used in connection with other types of game systems. For example, in some embodiments, the recognition process may be applied to recognize a complete toy construction model rather than to perform realtime recognition of elements added as part of an incremental building process.

The game system comprises the following main components:
- real-world toy construction elements that may be detachably interconnected with each other to form a toy construction model 111,
- optionally a depth camera 127,
- a video camera 112 operable to produce a color image of a scene including a toy construction model. The video and depth cameras may be integrated into a single unit, or they may be separate units arranged in a fixed spatial relation to one another. Alternatively to a video camera and a depth camera, another form of image capture device, such as a stereo camera configured to obtain depth information and images at the same time, or even a conventional digital camera may be used. Some embodiments may use 'Parallel Tracking and Mapping' (PTAM) or similar methods, e.g. in combination with a moving camera.
- a computing device 113 having stored thereon a computer program executable by a processor 114 of the computing device. The computing device may e.g. be a portable device such as a tablet computer, a smartphone, a laptop computer or the like, or a stationary computer. The computer program includes several main modules: a signal processing module 116 configured to receive and process image data and, optionally, depth data, a 3D detection module 120 configured to detect one or more toy construction elements in one or more images; an object recognition module 121 configured to recognize toy construction elements from digital image data;

and a user experience module 122. The computing device further comprises a display 123 and a user interface device 124.

The signal processing module 116, the recognition module 121, the detection module 120 and the user experience module 122 may be implemented by the one or more processors 114.

The computing device 113 further comprises a library 119 (e.g. in the form of a database) comprising information about known toy construction elements, such as 3D models and attributes of the toy construction elements. The signal processing module 116 is operable to interpret input signals from the video camera and, optionally, from the depth camera. The input signals may be processed in real time as the video and, optionally the depth information is retrieved from the respective cameras. The signal processing module performs pose estimation on the color image input, so the position and orientation of the video camera relative to the scene is determined. This can be done by locating (as 2D pixel positions) a number of distinct image features for which the (3D) physical position is known, and by estimating the position and orientation of the camera relative to the scene from these 2D-to-3D correspondences. There exist a number of feature descriptors that may be used, such as SURF, SIFT, BRISK, ORB, FREAK, HoG. An example of a pose estimation process is described in "Fast and globally convergent pose estimation from video images." C.-P. Lu, G. D. Hager and E. Mjolsness, IEEE Pattern Analysis and Machine Intelligence 22(6), 610-622, 2000.

Based on prior information about the relative position and orientation between the color and depth sensors, the relative position of the depth camera with respect to the toy construction model may be computed from the computed position of the video camera. Temporal noise filtering may be performed on the depth signal. Based on a camera model, which is indicative of a relationship between the position of a pixel in the image and the direction of the incoming light in physical space, the depth signal may be translated into a 3D point cloud where each depth sample is translated into a physical 3D position.

Each pixel in the color image may be classified into the most probable color in the set of colors of the toy construction elements. The classification may be based on a data-driven model, e.g. a machine learning algorithm, or on another suitable technique known as such within the field of computer vision. Each of the toy construction elements has one of a set of known colors, and by looking at the pixels depicting each toy construction element, a classifier can be trained such that the trained classifier, given a color sample, can estimate the probability of this color belonging to the different color classes. This can be done using support vector machines or another machine learning technique.

The 3D detection module 120 is operable to detect changes in the scene. Based on the input from the signal processing module, the 3D detection module maintains a 3D model of the scene in memory and compares input information from the depth camera with the 3D model. If changes between the input signal and the 3D model in memory are detected, the video information from the video camera is sent to the object recognition module. In one embodiment, only a part of the field of view of the video camera is forwarded to the recognition module, e.g. a crop that includes the area of the detected change and a predetermined neighborhood of the detected change. In order to prevent unwanted comparisons when e.g. a user's hand appears in the scene during the building process, a hand detection process may be included in the 3D detection module. For example, if parts of the 3D point cloud from the current sensor input are found to be inside a virtual 3D zone around and above the building area, the process determines that this change is due to the user reaching a hand or an arm towards the toy model. If hands are detected in the scene, no comparison will be conducted. After the hands are removed from the scene, the 3D detection module will look for changes in the scene as described above.

The recognition module 121 receives the generated image, images, or image crops from the 3D detection module and uses a recognition system, e.g. based on a classification model, computer vision techniques, neural networks, or the like to correctly classify the toy construction element(s) shown in the image, images or image crops. After classifying the image, information about the toy recognized toy construction element (e.g. an identifier identifying the type and color of the toy construction element) that is recognized is returned to the 3D detection module 120. In one embodiment, the recognition module 121 outputs a list of possible recognized toy construction elements along with respective likelihood scores.

The 3D detection module 120 receives the information about the recognized toy construction element—or list of possible toy construction elements—from the recognition module. Based on this information, the 3D detection module attempts to estimate placement of the toy construction element of the returned list that best fits with the depth signal and the color classifications previously created by the 3D detection module.

Because of the physical constraints imposed by the toy construction system when interconnecting toy construction elements, there exists a limited number of positions and orientations each new toy construction element can be added to the existing virtual model. The 3D detection module analyses the possible 3D placements and computes a correspondence score based on the correlation of the possible placement with the depth images and classified color images.

The correspondence score includes a connectivity likelihood score indicative of whether the coupling members are compatible with, and can be connected to, the coupling members of the previously recognized toy construction elements in the model and, in particular, those that are adjacent to the possible placement of the currently analyzed candidate toy construction element. An example of this process is described in more detail below.

These scores may then be combined with the likelihood scores from the recognition module to arrive at a combined likelihood score for each candidate toy construction element.

The candidate toy construction elements are then sorted according to their respective combined likelihood scores and the construction element with the highest score is then passed to the user experience module 122 together with a reference position where the newly placed element has been detected. In one embodiment, a list of candidates, for both elements and positions, may be forwarded so as to allow the user experience module to provide the user with an option to select the correct candidate, e.g. by presenting a ranked list and allow the user to use arrow keys on keyboard, a joystick, a touch screen or another user-interface to indicate a user selection.

The user experience module 122 thus receives information about the newly placed toy construction element and its position in the scene. This module then generates a digital version 126 of the toy construction model. Hence, a toy construction model built in the real world may be translated into a virtual toy construction model constructed from virtual toy construction elements. The virtual model may have various attributes which correspond to specific toy construction elements used in the physical building process. For example, if e.g. a car is built, then speed, acceleration, steering etc. may depend on the selected engine parts, tires, on the amount of bricks used etc.

Figure 2:
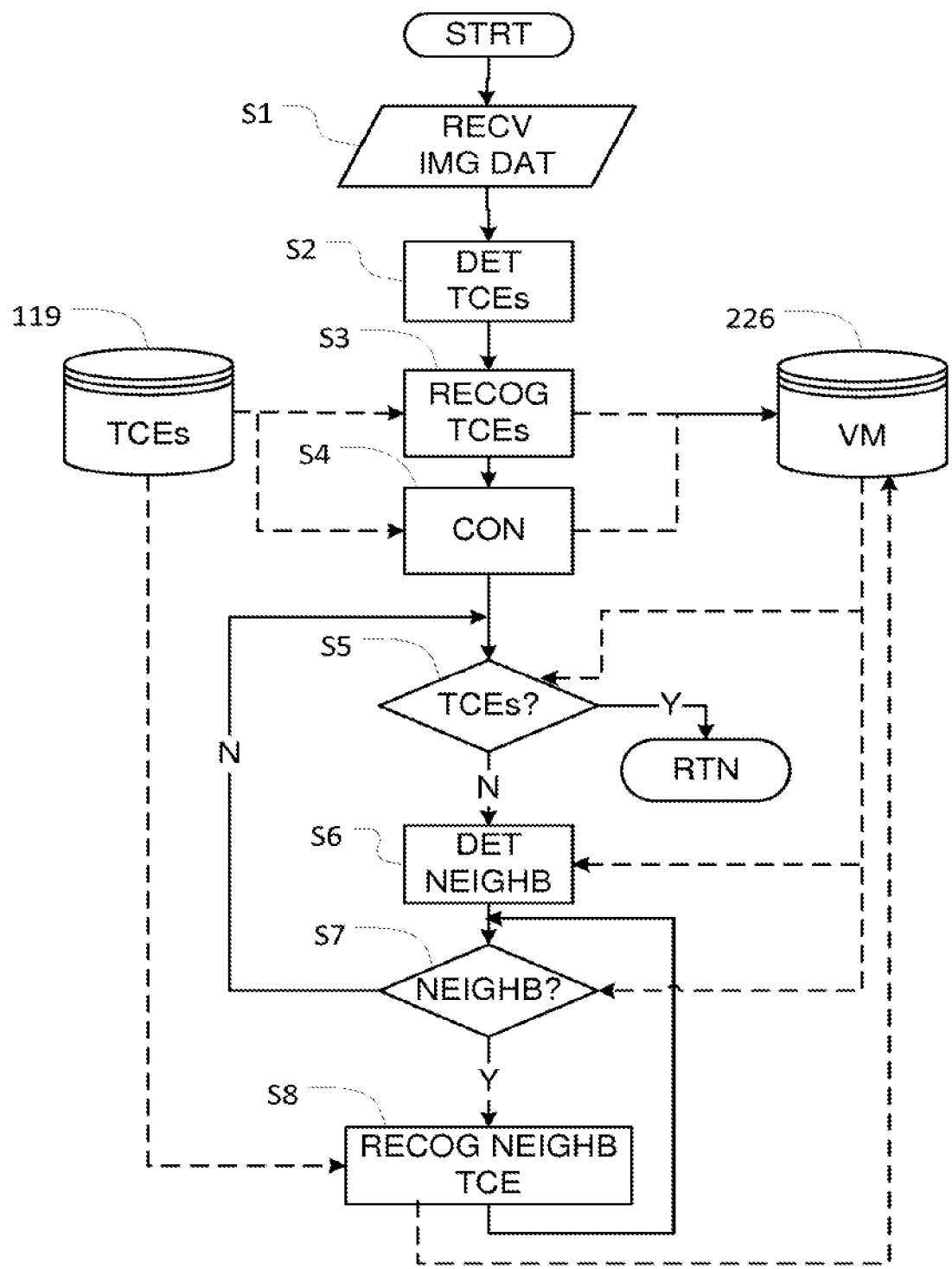
FIG. 2 shows a flow diagram of an example of a process for recognising a toy construction model.

FIG. 2 shows a flow diagram of an example of a process for recognising a toy construction model. The process may be executed by a suitable programmed data processing device or system, e.g. by a portable processing device, but a host computer in communication with a client terminal or by another suitable data processing system. For example, the process may be executed by the system of FIG. 1.

In initial step S1, the process receives image data representing a real-world scene including the toy construction model to be recognised. The image data may represent one or more images of the scene, such as one or more color images, a video stream or another suitable representation. The process may receive the image data from one or more cameras or other suitable image capture devices. The camera or other image capture device may be internal or external to the data processing device or system that performs the method. The image data may include color information and, optional, depth information, e.g. as available from a depth sensor, a stereo camera, or another suitable source.

In subsequent step S2, the process processes the received image data so as to detect the toy construction model in the scene and to detect individual toy construction elements within the toy construction model. For example, the process may perform pose estimation on the image data so the position and orientation of the camera relative to the scene is determined. The process may further perform background detection so as to separate image portions representing the toy construction model to be recognized from image portions representing a background (or other objects). To this end, the process may use any suitable techniques known as such in the art of computer vision. The process may further detect individual toy construction elements within the image, e.g. using edge detection, feature detection and/or other suitable techniques. The detection of individual toy construction elements may result in a representation of a boundary or bounding volume representing the position, shape and size of individual detected toy construction elements within the model. The process may create a data structure 226 comprising a digital representation of the toy construction model. For example, ultimately, the data structure may represent the individual toy construction elements, their positions and representations within the model as well as information as to how they are connected to other toy construction elements in the model. For example, the data structure may be represented as a graph where nodes of the graph represent toy construction elements and links between nodes represent connections between toy construction elements. Alternatively, other forms of data structures may be used. An example of a suitable data structure is described in WO 04/034333. During step S2, an initial version of the data structure is created, e.g. as a list of detected toy construction elements, their bounding volumes and positions. During the subsequent step additional information will be added such as identifiers identifying the individual toy construction elements as respective known toy construction elements, connectivity information indicative of how they are connected with the other toy construction elements of the model, likelihood scores indicative of the confidence level of the recognition, and/or the like. This will be described in more detail with reference to the subsequent steps of the method of FIG. 2.

In subsequent recognition step S3, the process performs an initial recognition of the detected toy construction elements. The recognition step receives the image and the positions of the detected toy construction elements, optionally in the form of image crops depicting individual detected toy construction elements. The recognition step performs a recognition process, e.g. using a feature analysis, a classification model, computer vision techniques, neural networks, and/or the like to correctly classify the toy construction elements shown in the image, images or image crops. To this end, the process may utilize a library 119 of digital representations of known toy construction elements; each known toy construction element may have an associated identifier identifying the toy construction element. The recognition step recognizes each detected toy construction element as one of the known toy construction elements from the library and returns an identifier of the known construction element from the library that is the most likely match. In some embodiments, the recognition step outputs a list of possible recognized toy construction elements along with respective likelihood scores. The process stores the resulting identifiers, or lists of identifiers, and the computed likelihood scores in the data structure 226.

Even though, in the present example, the detection and recognition of individual toy construction elements are described as parts of separate steps (steps S2 and S3, respectively) it will be appreciated that the recognition of individual toy construction elements may be performed as an integral part of the initial detection of the toy construction elements within the image.

In subsequent step S4, for each recognized toy construction element, the process identifies the positions of the coupling members of each recognized toy construction element within the image and computes a first connectivity likelihood score for each coupling member indicative of a likelihood that the coupling member engages a coupling member of a neighboring toy construction element. To this end, the process uses information of the corresponding known toy construction element from the library 119. In particular, the library may comprise a digital representation of the toy construction element that represents the positions of each coupling member relative to the toy construction element. A suitable data structure for representing the coupling members of toy construction elements is described in WO 04/034333 which is incorporated herein in its entirety by reference. The computation of the connectivity likelihood may be based on feature detection, a suitable classification model or any other suitable technique known as such within the field of computer vision. For example, when the process can recognise a coupling member of a toy construction element as being clearly visible and unobstructed, the process may assign a low connectivity likelihood to said coupling member. However, when the coupling member is not recognized as visible but as being concealed by another one of the detected toy construction elements that is detected in a close proximity of the coupling member, than the process will assign a high connectivity likelihood to the coupling member. The connectivity likelihoods of the coupling members of the recognized toy construction elements are stored in the data structure 226 representing the virtual model of the toy construction model. In embodiments, where recognition step S3 returns a list of possible candidates for each toy construction element, step S4 may accordingly compute connectivity likelihoods for the coupling members of each of the candidates, e.g. in the form of connectivity likelihoods for the respective coupling members computed under the assumption that the detected toy construction element is indeed one of the candidates. In some embodiments, the process only computes connectivity likelihoods for some toy construction elements or for some candidates, e.g. only for those that have a recognition likelihood above a predetermined threshold. The process stores the resulting connectivity likelihoods in the data structure 226. Initially, the connectivity likelihood associated with a coupling member may be a likelihood that merely represents a general likelihood that the coupling member is connected to some other coupling member without reference to which other coupling member this may be. This may be advantageous as the process may not yet have recognized the neighbouring toy construction elements and thus may not yet have any knowledge about any specific neighbouring coupling members to which the coupling member in question may be connected. It will further be appreciated that, even though steps S3 and S4 are shown as separate steps in FIG. 2, step S4 may be performed as an integral part of step S3 rather than as a separate step.

In step S5, the process determines whether all detected toy construction elements have been recognized or recognized with a sufficiently high confidence. For example, the process may determine whether all detected toy construction elements have been recognized with a likelihood score above a predetermined threshold. If yes, the process stops; otherwise the process proceeds at step S6.

In step S6, the process selects a one of the toy construction elements that have been recognised with high likelihood score, e.g. the toy construction element that has the highest likelihood score of recognition and that has not yet been selected in previous iterations. The process then detects immediate neighbours (i.e. neighbouring toy construction elements) of the selected toy construction element, e.g. toy construction elements whose bounding volumes are within a predetermined proximity of (e.g. those having a common boundary with) the selected toy construction element.

In step S7, the process determines whether any of the detected immediate neighbours of the selected toy construction element have not yet been recognised with a sufficiently high likelihood score, e.g. with a likelihood score higher than a predetermined threshold. If this is the case, the process proceeds at step S8; otherwise the process returns to step S5.

In step S8, the process selects one of the detected neighbours of the selected toy construction element, e.g. the neighbour with the highest previous likelihood score (but below a predetermined threshold). The process then analyses each of the coupling members of the selected neighbour and determines a connectivity likelihood that the coupling member is consistent with the relative placement of the selected neighbour relative to the selected toy construction element and that the coupling member can be connected to one of the coupling members of the selected toy construction element. To this end, the process may consider each coupling member of the selected toy construction element at a time: For each coupling member of the selected toy construction element the process determines whether one or more of the coupling members of the selected neighbour is within a proximity of said coupling member of the selected toy construction element. If this is the case, the process determines whether the type of the coupling member of the selected toy construction element is compatible with the coupling member detected within the proximity. If this is the case, i.e. if the coupling members can form a mating connection, the connectivity likelihood of the coupling member of the selected neighbour is increased; otherwise the connectivity likelihood is decreased. This determination may also depend on the previously determined first (general) connectivity likelihood of the coupling member of the selected toy construction element described above. Similarly, the process may process each coupling member of the selected neighbour and determine whether there are any compatible or incompatible coupling members of the selected toy construction element in its proximity.

The determination of compatibility may be based on connection types where each coupling member may have associated one connection type of a set of possible connection types. For example, the process may use a connection table or matrix, where each entry into the matrix is indexed by a pair of connection types and indicates whether the pair of connection types is compatible with each other, e.g. as described in WO 04/034333. Based on the determined connectivity likelihoods of individual coupling members a consolidated connectivity likelihood of the selected neighbour may be computed and used to re-compute the recognition likelihood of said neighbour. In particular, if the coupling members of the selected neighbour have a high connectivity likelihood of being consistent with the selected toy construction element, the recognition likelihood score of the selected neighbour may be increased; otherwise, the recognition likelihood score may be decreased. It will be appreciated that the connectivity likelihood may also be used to re-compute the recognition likelihood of the selected toy construction element.

With reference to FIGS. 3, 4, 5A-C, 6, 7A-B and 8A-B, and with continued reference to FIG. 2, an example of the recognition process illustrated in FIG. 2 will now be further described based on a specific example of a toy construction model.

Figure 3:
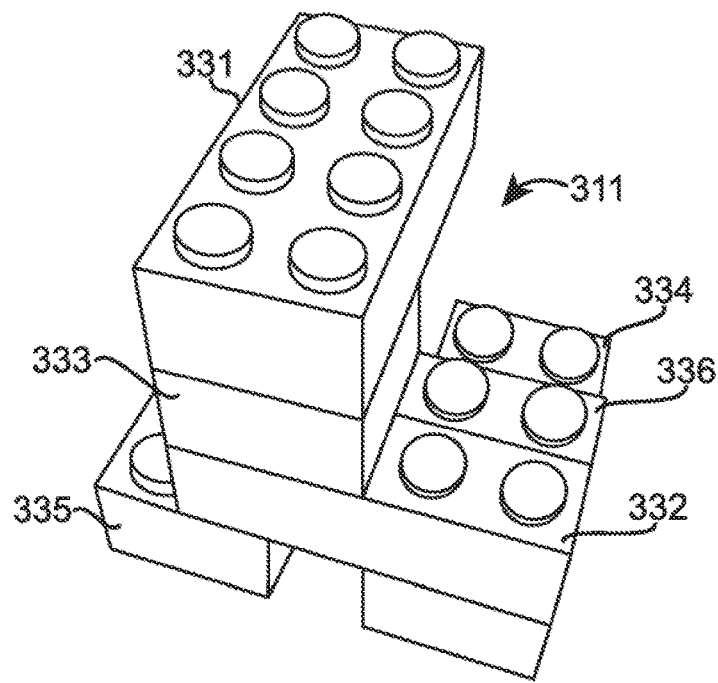
FIGS. 3, 4, 5A-C, 6, 7A-B and 8A-B illustrate an example of a process for recognising a toy construction model.

FIG. 3 shows a captured image of a scene including a toy construction model 311. For example, the process may receive a captured image as the one shown in FIG. 3 as an input. As described above, some embodiments of the process receive multiple images, a video stream and/or depth information and/or further information facilitating the recognition process. However, for the purpose of the present example and ease of description, an embodiment of the process is considered that receives a simple digital color image. The toy construction model 311 of this example is constructed from toy construction elements 331-336 in the form of bricks that are available under the name LEGO. In particular, bricks 331 and 334 are box-shaped bricks, each having a matrix of 2×4 coupling studs at its top surface and corresponding cavities for receiving such studs at its bottom side. Bricks 332 and 336 are box-shaped bricks, each having a matrix of 1×4 coupling studs at its top surface and corresponding cavities for receiving such studs at its bottom side. Finally, bricks 333 and 335 are box-shaped bricks, each having a matrix of 2×2 coupling studs at its top surface and corresponding cavities for receiving such studs at its bottom side. It will be appreciated that embodiments of the process described herein may also be performed with other types of toy construction elements and/or with a different number and/or arrangement of toy construction elements.

Figure 4:
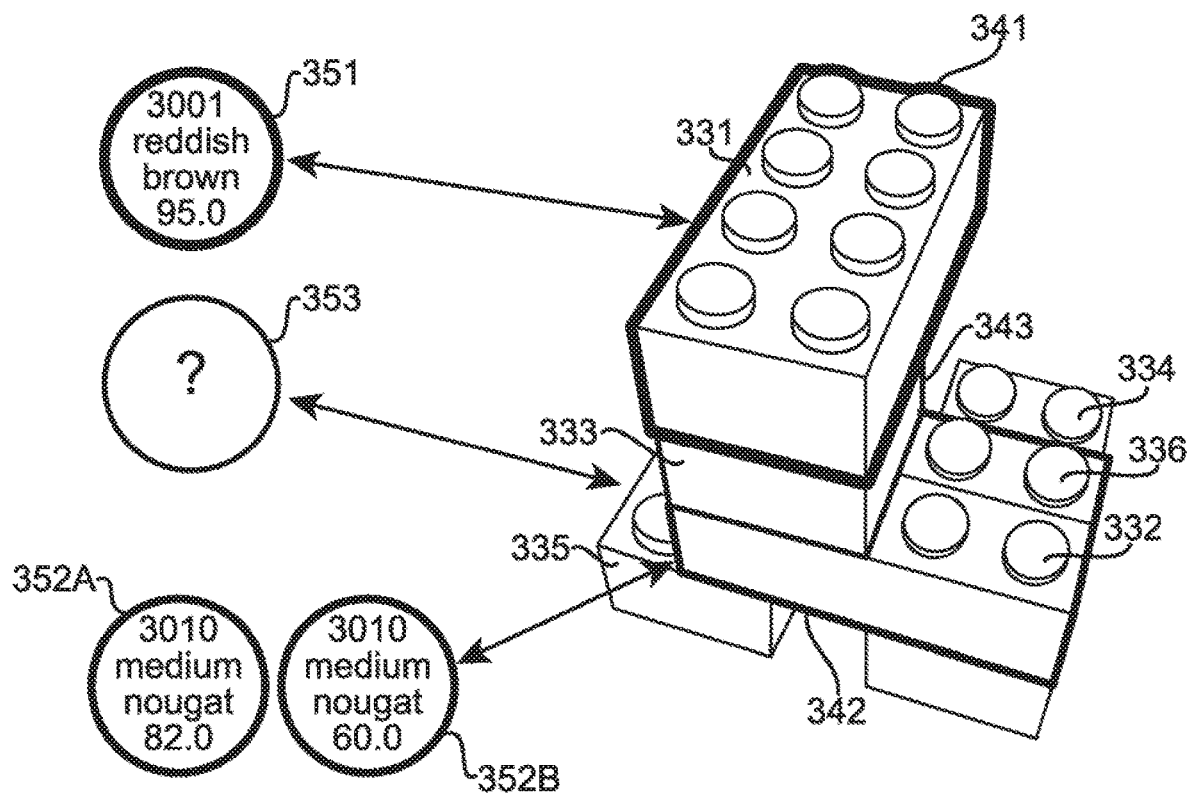

FIG. 4 illustrates the results of detection step S2 and recognition step S3. In particular, FIG. 4 shows the captured image of the toy construction model where three detected bounding volumes 341, 342 and 343 have been overlaid. Bounding volume 341 is associated with brick 331 while bounding volume 343 is associated with brick 333. In this example, it is assumed that the detection step has not been able to identify bricks 333 and 336 as separate bricks but has rather identified them as one single brick as illustrated by bounding volume 342. For ease of presentation, the detected bounding volumes of bricks 334 and 335 have not been illustrated.

The recognition step S3 thus receives the original image data and the bounding volumes as an input and returns initial recognition results based on a library of known toy construction elements. In the present example, each brick is assigned an identifier comprising two parts: and identification number that uniquely identifies the shape and size of the brick (i.e. the geometrical features of the brick) and an identifier identifying the color of the brick.

In the present example, the recognition step S3 has identified the brick corresponding to bounding box 341 as brick "3001 reddish brown", where "3001" is an identifier that identifies the geometry of the brick and "reddish brown" identifies its color. The process has further computed a recognition likelihood score between 0 and 100, where 100 represents absolute certainty. In the example of brick 331, the computed recognition likelihood score is 95.0 representing a high level of confidence. In the example of FIG. 4, the initial recognition results are represented as circles, e.g. circle 351 representing the recognition result for recognizing brick 331. In the present example, the recognition step has not been able to recognize the brick corresponding to bounding volume 343 with a sufficiently high confidence (e.g. with a recognition likelihood score above a predetermined threshold, e.g. 80.0), as there are a number of alternative known bricks that would be consistent with the image data and the detected bounding volume and due to the lack of features (no studs can be seen, small angles, . . . ). However, the colour is recognized as lavender. In FIG. 5, this is illustrated by circle 353 labelled with a question mark.

Moreover, in respect of bounding box 342, the process has determined that the geometry is consistent with a brick type "3001", i.e. a box-shaped brick having a 2×4 matrix of coupling studs on its top side. Also, the process has identified the color within the bounding volume 342 as "medium nougat". However, as the library of known bricks does not include any brick "3001 medium nougat", this is not any valid candidate in the library. The process has also identified that the bounding volume would be consistent with two elongated box-shaped bricks that are placed side by side and that each have a 1×4 matrix of studs on their top sides. This brick type has an associated identifier "3010" and, since a brick "3010" in color "medium nougat" is present in the library 119, the process has associated the bounding box 342 with two recognised bricks, as illustrated by circles 352A-B, each having its own recognition likelihood score associated with it, in this example 82.0 and 60.0 respectively.

It will be appreciated that the process may return additional candidate recognition results for each of the bounding boxes. For example, the process may return a recognition result for bounding box 341 that corresponds to two 1×4 bricks arranged side by side. In the example of FIG. 4, only recognition results having a recognition likelihood score of at least 80.0 associated with a brick are reproduced for reasons of simplicity of illustration.

Figure 5A:
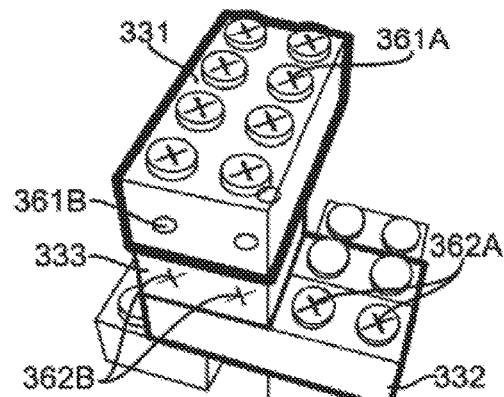
Figure 5B:
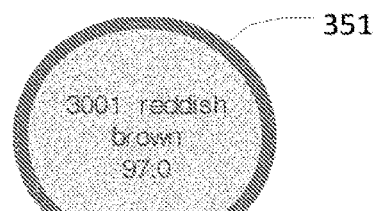
Figure 5C:
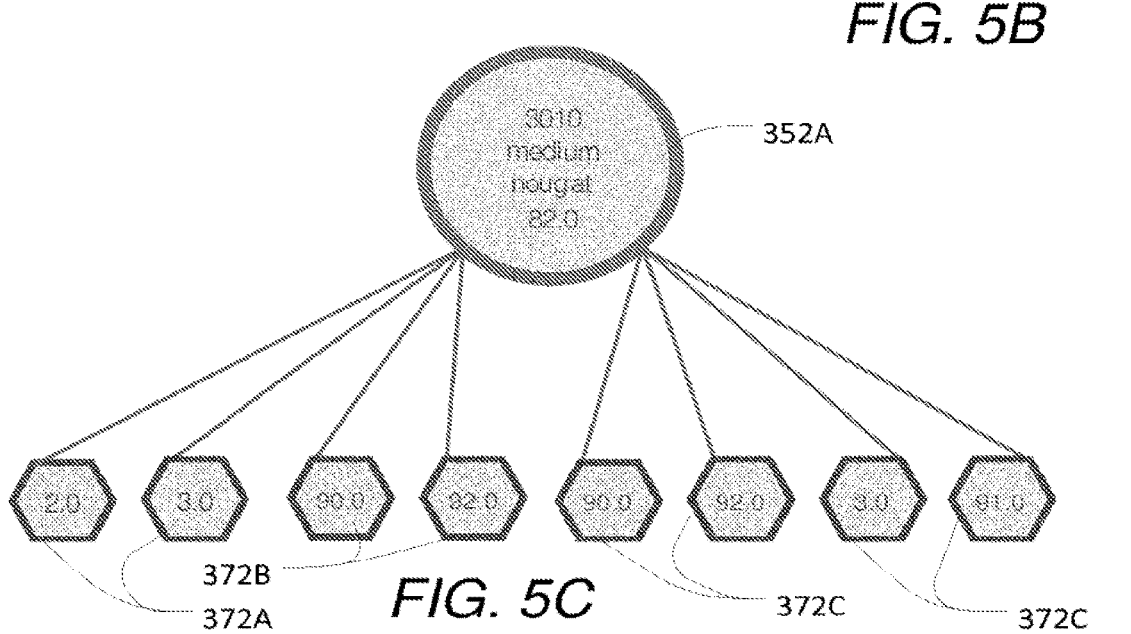

FIGS. 5A-C illustrate the result of step S4 of the recognition process. In particular, FIG. 5A shows the captured image with detected bounding boxes as described with reference to FIG. 4. In addition, the process has, based on the geometry information stored in library 119 for the respective known bricks, identified the position of the coupling members of these bricks, in this case studs and mating cavities. The positions of the studs of recognised element 351, when its position is matched with the image data and, in particular, with the image data of brick 331, are indicated by crosses 361A in FIG. 5A, the positions of three of the corresponding cavities are indicated by circles 361B. Even though the cavities are not actually visible in the image, their position can be determined from the geometry information in the library. Similarly, the positions of the studs of element 352A, when matched to the image data of brick 332, are also indicated by crosses 362A-B. As can be seen from FIG. 5A, studs 362A are visible in the image while studs 362B are concealed by the neighbouring brick 333.

FIG. 5B illustrates the connectivity likelihoods of the various coupling members of recognised brick element 351, which corresponds to brick 331 in the image of FIG. 5A. Brick 351 has 2×4=8 studs on its top side and corresponding 2×4=8 cavities on its bottom side, i.e. a total of 16 coupling members. In FIG. 5B, the corresponding computed first connectivity likelihoods are illustrated as diamonds associated with the element 351. The connectivity likelihoods are expressed on a scale from 0 to 100 where 100 corresponds to absolute certainty. In particular, the connectivity likelihoods of the studs 361A are shown as diamonds 371A (for simplicity only 2 diamonds are explicitly shown). Their connectivity likelihoods are low (in the shown examples 2.0 and 3.0, respectively), as all studs 361A are clearly visible in the image. The connectivity likelihoods of cavities 361B, which are illustrated as circles in FIG. 5A, are shown as diamonds 371B. Their values are relatively high (90.0, 92.0 and 85.0, respectively), as these cavities are determined to be in close proximity to (already detected but yet unrecognised) brick 333. The connectivity 371C of the remaining five cavities (of which only three are explicitly shown in FIG. 5B) are lower—in this example, 60.0, 10.0 and 50.0, as no adjacent brick was detected. However, as an adjacent brick connected to one or more of these cavities would potentially be invisible from the current camera viewpoint (also depending on the size and shape of any such brick), some of the connectivity likelihoods are around 50.

FIG. 5C illustrates the connectivity likelihoods of the various coupling members of brick element 352A, which corresponds to brick 332 in the image of FIG. 5A. Brick 352A has 1×4=4 studs on its top side and corresponding 1×4=4 cavities on its bottom side, i.e. a total of 8 coupling members. The connectivity likelihoods of the studs 362A are shown as diamonds 372A. Their connectivity likelihoods are low (in the shown examples 2.0 and 3.0, respectively), as all studs 361A are clearly visible in the image. The connectivity likelihoods 372B of studs 362B are relatively high (90.0 and 92.0, respectively), as these studs are determined to be in close proximity to (already detected but yet unrecognised) brick 333. The connectivity 372C of the four cavities (not explicitly indicated in FIG. 5B) are 90.0, 92.0, 3.0 and 91.0, respectively, again based e.g. on their visibility and proximity to other bricks.

FIGS. 6, 7A-B and 8A-B illustrate the results of step S8 of the process. In particular, as described above, the process will iterate through the toy construction elements that have been recognised with high confidence (e.g. score above a predetermined threshold, such as above 80.0). For each of the recognised toy construction elements, the process determines neighbouring toy construction elements and which of the toy coupling members of the recognised toy construction elements are likely to connect to the neighbour. In the present example, this process will result in the detection of yet to be recognised element 353 (corresponding to brick 333 in the captured image) as a neighbour to both recognised brick 351 (corresponding to brick 331 in the captured image)

and recognised brick 352 (corresponding to brick 332 in the captured image, see FIG. 5A). Moreover, the process determines that coupling members 371B of brick 351 have a high connectivity likelihood of being connected to element 353 based on the proximity of brick 333 to the coupling members 371B, In particular, the respective likelihoods of element 353 being connected to coupling members 371B are illustrated by diamonds 381B. In the present example the numeric values of the connectivity likelihoods 381B are 90.0, 92.0 and 85.0, respectively. Similarly, the process determines that coupling members 372B of brick 352 have a high connectivity likelihood 382B of being connected to element 353 based on the proximity of brick 333 to the coupling members 372B. In the present example the numeric values of the connectivity likelihoods 382B are 90.0 and 92.0, respectively.

Using the connectivity likelihoods 381B and 382B and the detected color within bounding volume 434, the process can perform an updated recognition of brick 333 and compute an updated recognition likelihood value. In particular, the process can determine the positions and types of the coupling members 361B and 362B of the already recognised elements that are in a proximity of element 333. When determining the recognition scores of different known toy construction elements from the library 119, the process determines which of these toy construction elements
1) have a shape that can be placed in accordance with the bounding volume 343, and
2) have coupling members of consistent types in a proximity of the positions of the coupling members 361B and 362B when the toy construction element is placed in accordance with the bounding volume 343.

Figure 6:
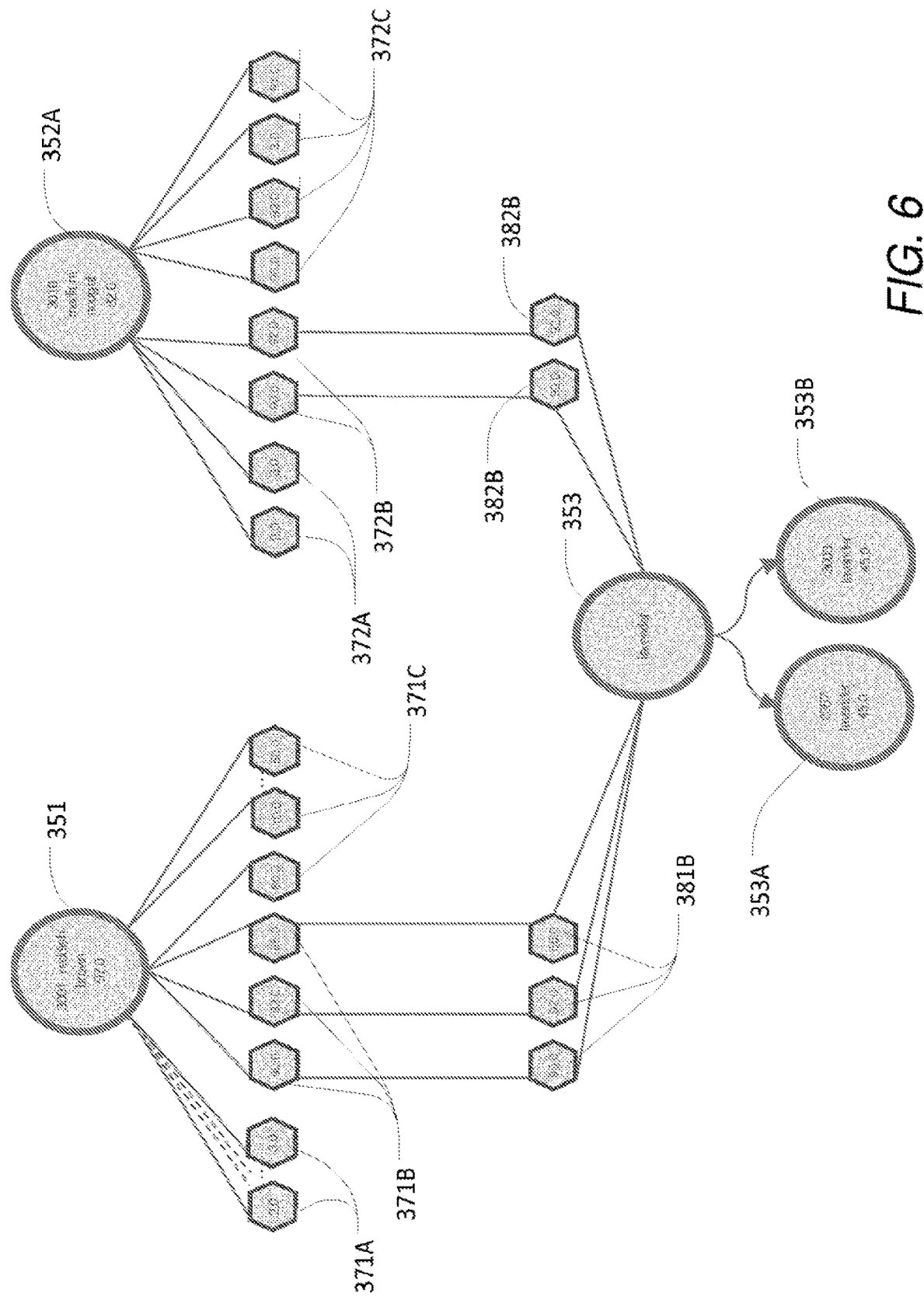

Based on the information about the bounding volume and the additional information about the coupling members of the neighbours, the process determines updated candidates for toy construction element 333. In the present example, the process determines that, with a recognition likelihood score of 45.0, the toy construction element 333 may be a known toy construction element having a geometry identifier "2357" and color "lavender" (as illustrated in FIG. 6 by circle 353A) or, with a recognition likelihood score of 45.0, the toy construction element 333 may be a known toy construction element having a geometry identifier "3003" and color "lavender" (as illustrated in FIG. 6 by circle 353B).

These two examples are illustrated in more detail in FIGS. 7A-B and 8A-B respectively.

Figure 7A:
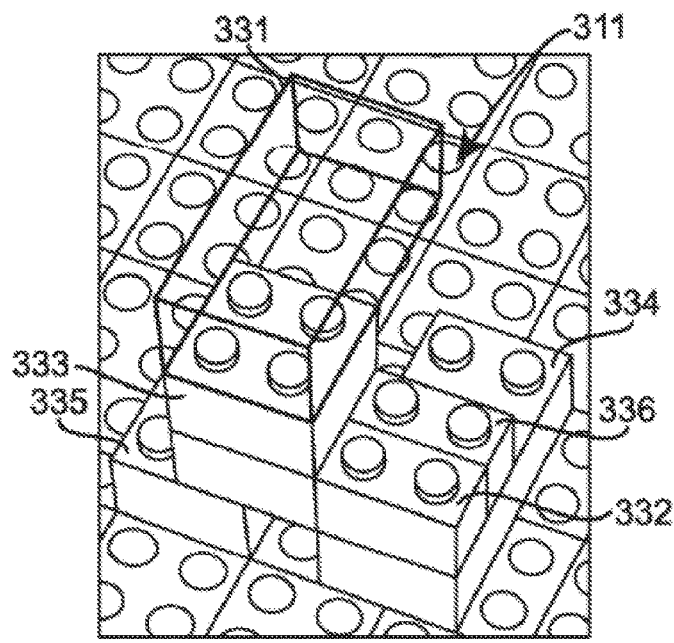
Figure 7B:
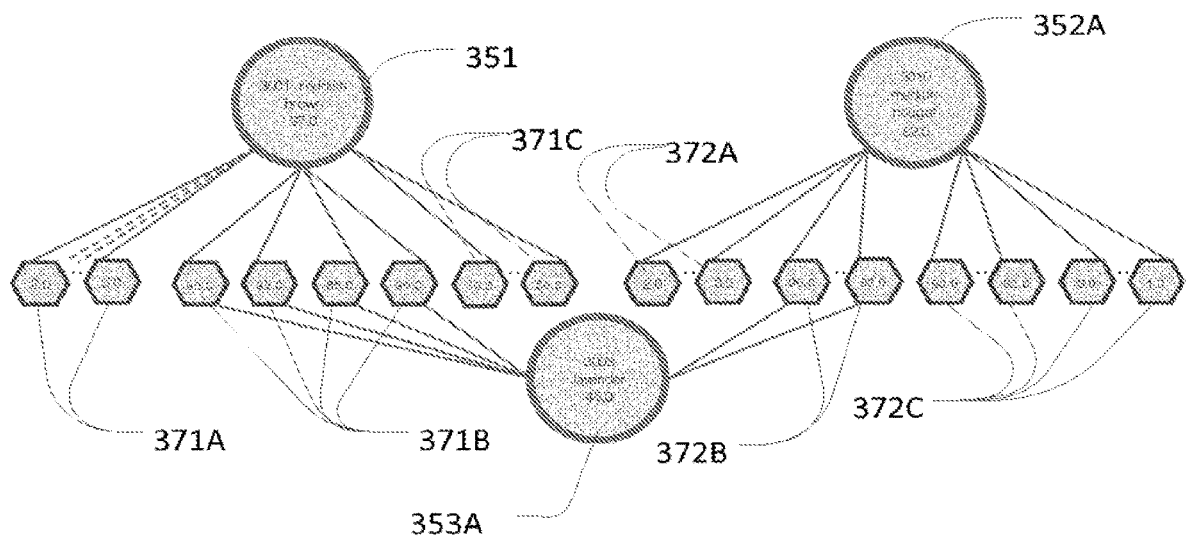

FIGS. 7A-B illustrate the solution with element 353A. FIG. 7A shows a digital representation of the solution with element 353A, i.e. a 2×2 brick. The computation of all connectivity likelihoods based on the specific coupling members of brick 353A, is illustrated in FIG. 7B. In particular, for this pair of candidate bricks, element 353A is connected to element 351 by four coupling members. It is noted that these connectivity likelihoods (also referred to as second connectivity likelihoods) are likelihoods for connection between specific coupling members of the respective elements, while the previous connectivity likelihoods computed in step S4 were unspecific likelihoods of a coupling member of one brick being connected to any other brick (this likelihood is also referred to as first connectivity likelihood).

Figure 8A:
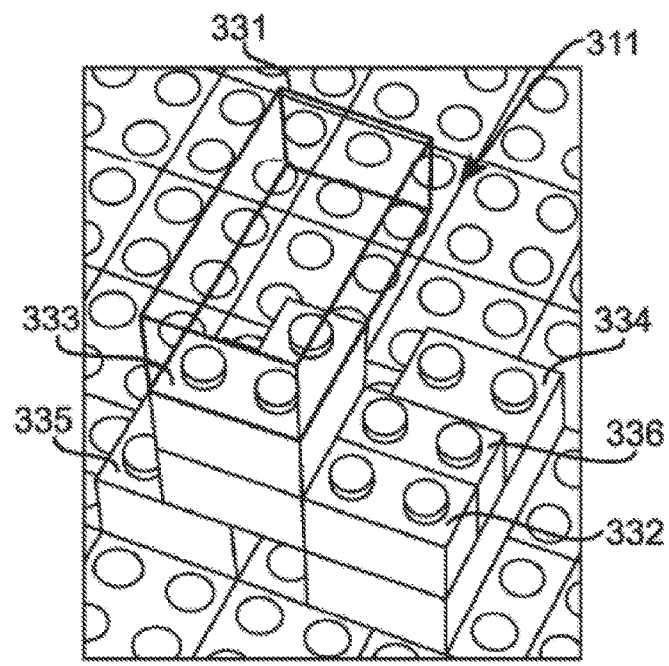
Figure 8B:
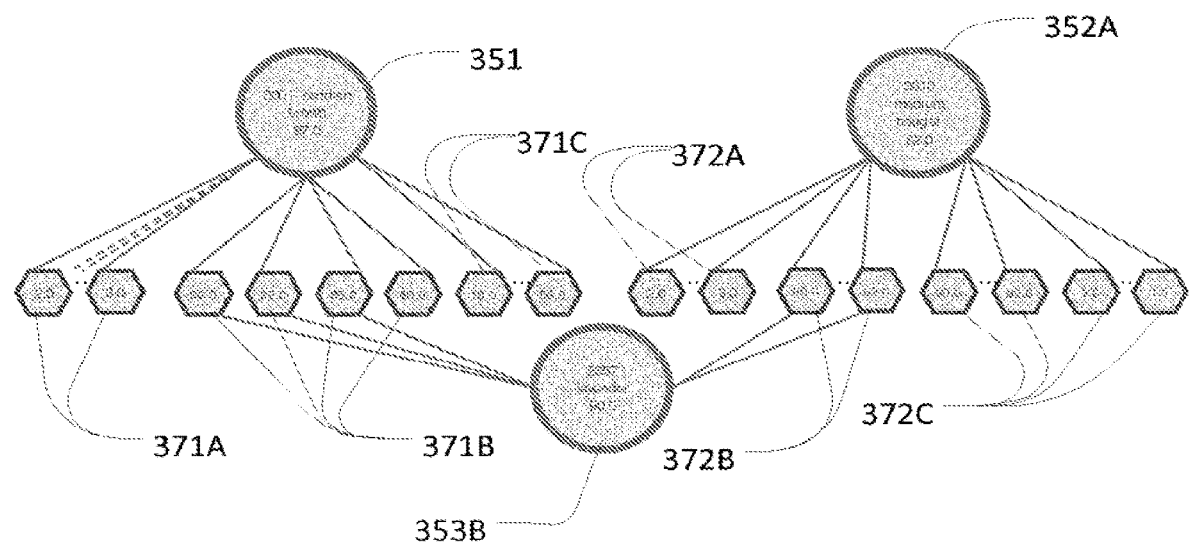

FIGS. 8A-B illustrate the solution with element 353B. FIG. 8A shows a digital representation of the solution with element 353B, i.e. an L-shaped brick having three coupling studs on its top surface. The computation of all second connectivity likelihoods based on the specific coupling members of brick 353B is illustrated in FIG. 8B. In particular, for this pair of candidate bricks, element 353B is connected to element 351 by only three coupling members.

However, based on the information available from the captured image alone, the process is unable to decide which of the two alternatives is more likely, as the relevant parts of brick 333, which would be needed to make that distinction, are concealed in the captured image.

In any event, the process illustrated above for elements 331, 332, and 333 may then be repeated for the other bricks of the model until every visible toy construction element is accounted for. At the end, the process may have resolved some ambiguities based on additional connectivity information with other bricks, or the process may arrive at multiple equally likely solutions, where a decision has to be made which one should be presented. In such an event, the process may request user input and/or use other information to select one of the alternatives, e.g. using a priori likelihoods of the different brick types (e.g. from production numbers, their occurrence in predetermined construction sets, etc.), favouring a model with fewer elements, with more connections and/or using other selection criteria.

Although the invention has been described with reference to certain specific embodiments, various modifications thereof will be apparent to those skilled in art without departing from the spirit and scope of the invention as outlined in claims appended hereto.

What is claimed is:

1. A computer-implemented method for recognizing a plurality of real-world construction elements of a construction system assembled to form a real-world construction model, in particular toy construction elements of a toy construction system assembled to form a real-world toy construction model, each real-world construction element comprising coupling members for detachably connecting the real-world construction element with one or more other real-world construction elements of the construction system so as to form the real-world construction model; wherein the method comprises:
   receiving at least one captured image of the real world construction model;
   processing the at least one captured image so as to at least preliminarily recognise at least a first real-world construction element in the at least one captured image as a first known real-world construction element from stored digital representations of a plurality of known real-world construction elements of the construction system, each digital representation comprising connectivity information indicative of how the corresponding real-world construction element can be detachably connected to other real-world construction elements of the construction system;
   detecting image data of at least a second real-world construction element in the image within a proximity of the recognised first real-world construction element; and
   recognising the second real-world construction element as a second known real-world construction element from said stored digital representations of said plurality of known real-world construction elements of the construction system; wherein recognising the second real-world construction element is based at least in part on the connectivity information associated with the first and second known construction elements;
   wherein the connectivity information is indicative of a connection type associated with each coupling member.

2. A method according to claim 1, wherein processing the at least one captured image comprises identifying an object portion and a background portion of the at least one captured image, the object portion representing the construction model.

3. A method according to claim 1, further comprising determining a first likelihood score indicative of a likelihood that said recognised first real-world construction element is the first known real-world construction element.

4. A method according to claim 3, further comprising updating the first likelihood score based on the recognition of the second real-world construction element.

5. A method according to claim 1, wherein recognising the second real-world construction element further comprises:
determining one or more candidate construction elements from said stored digital representations of said plurality of known real-world construction elements of the construction system, each candidate construction element having an associated second likelihood score indicative of a likelihood of the respective candidate construction element to be the detected second real-world construction element depicted in the at least one captured image.

6. A method according to claim 5, wherein recognising the second real-world construction element further comprises:
for each of the candidate construction elements and based on the captured image, estimating a placement of a corresponding virtual construction element in a virtual construction model corresponding to the real-world construction model;
computing a respective correspondence score for each candidate construction element based on a correlation of the estimated placement with at least the captured image; and
selecting a candidate construction element and a corresponding placement based at least on the computed correspondence scores.

7. A method according to claim 6, wherein estimating the placement in a virtual construction model is based at least on one or more of received depth information and received colour information.

8. A method according to claim 5, wherein recognising the second real-world construction element further comprises:
determining a first connectivity likelihood that a coupling member of the recognized first real-world construction element is connected to another real-world construction element of the real-world construction model.

9. A method according to claim 8, wherein recognising the second real-world construction element further comprises:
for each candidate construction element, determining a second connectivity likelihood that a coupling member of the candidate construction element, when positioned at a position of the detected second real-world construction element within the real-world construction model, is connectable with a coupling member of the recognized first real-world construction element; and
determining the second likelihood score based on at least the determined second connectivity likelihood.

10. A method according to claim 9, wherein the second likelihood score is determined based on at least the determined first connectivity likelihood and the second connectivity likelihood.

11. A method according to claim 1, wherein the connection type is indicative of which other types of connection types the associated coupling member can be connected to.

12. A method according to claim 1, wherein the digital representation of each known real-world construction element is indicative of a number of grids relative to the corresponding known real-world construction element, each grid having a number of grid points; and each of the coupling members of the known real-world construction element is associated with one of the grid points and has a corresponding connection type.

13. A method according to claim 1, further comprising:
determining a first coupling member of the recognized first real-world construction element which first coupling member is within a proximity of the detected second real-world construction element;
determining one or more compatible connection types of coupling members that can be detachably connected to the first coupling member; and
wherein recognizing the detected second real-world construction element is based at least in part on the connection types of the known real-world construction elements and on the determined compatible connection types.

14. A method according to claim 13, wherein recognizing the detected second real-world construction element comprises increasing a likelihood that the detected second real-world construction element is one of the known real-world construction elements that have a coupling member having one of the determined compatible connection types.

15. A method according to claim 13, further comprising:
determining a position of the detected second real-world construction element within the real-world construction model; and wherein recognizing the detected second real-world construction element further comprises:
determining a candidate coupling member of the second known real-world construction element that is in a proximity to the first coupling member when the second known real-world construction element is placed at said deter-mined position of the detected second real-world construction element; and
determining whether said second coupling member is compatible with the first coupling member.

16. A method according to claim 13, wherein recognizing the first real-world construction element further comprises:
determining a first placement of a digital representation of the first known real-world construction element in a virtual construction model corresponding to the real-world construction model; and wherein recognizing the second construction element comprises:
determining at least one candidate real-world construction element of the known real-world construction elements;
determining a candidate placement of a digital representation of the determined candidate real-world construction element in said virtual construction model;
determining a degree of compatibility of the candidate placement with the digital representation of the recognized first construction element placed at said determined first placement; and
determining a recognition likelihood of the detected second real-world construction element being the candidate real-world construction element based at least in part on the determined degree of compatibility.

17. A method according to claim 16, wherein determining the candidate real-world construction element and the candidate placement comprises determining a degree of consistency of a digital representation of the candidate construction element positioned at the candidate placement with the at least one captured image.

18. A computer-implemented method for recognizing a plurality of real-world construction elements of a construction system assembled to form a real-world construction model, in particular toy construction elements of a toy construction system assembled to form a real-world toy construction model, each real-world construction element comprising coupling members for detachably connecting the real-world construction element with one or more other real-world construction elements of the construction system so as to form the real-world construction model; wherein the method comprises:

- receiving at least one captured image of the real world construction model;
- processing the at least one captured image so as to at least preliminarily recognise at least a first real-world construction element in the at least one captured image as a first known real-world construction element from stored digital representations of a plurality of known real-world construction elements of the construction system, each digital representation comprising connectivity information indicative of how the corresponding real-world construction element can be detachably connected to other real-world construction elements of the construction system;
- detecting image data of at least a second real-world construction element in the image within a proximity of the recognised first real-world construction element; and
- recognising the second real-world construction element as a second known real-world construction element from said stored digital representations of said plurality of known real-world construction elements of the construction system; wherein recognising the second real-world construction element is based at least in part on the connectivity information associated with the first and second known construction elements;
- wherein the digital representation of each known real-world construction element is indicative of one or more attributes of the known real-world construction element, each attribute being chosen from the following attributes: a shape of the known real-world construction element, a size of the known real-world construction element, a bounding volume of the known real-world construction element, and one or more colors of the known real-world construction element.

19. A computer program product-comprising a program code configured, when executed by a data processing system, to cause the data processing system to perform the steps of the method according to claim 1.

20. A computer program product according to claim 19, embodied as a non-transitory computer-readable medium having stored thereon said program code.

21. A game system, comprising a plurality of real-world toy construction elements; a database of digital representations of known real-world toy construction elements; and a computer program product according to claim 19.

22. A data processing system configured to perform the method according to claim 1.

* * * * *